United States Patent
Leeke et al.

[11] Patent Number: 5,711,169
[45] Date of Patent: Jan. 27, 1998

[54] KNITTED COVERS

[75] Inventors: Gary John Leeke, Southfield, Mich.; Giles Timothy Gregory, Nottinghamshire; Malcolm Frederick Proctor, Nottingham, both of United Kingdom

[73] Assignee: General Motors Corporation, Detroit, Mich.

[21] Appl. No.: 619,052

[22] Filed: Mar. 20, 1996

[30] Foreign Application Priority Data

Apr. 1, 1995 [GB] United Kingdom ............ 95068078

[51] Int. Cl.$^6$ .................. D04B 1/22; A47C 20/02; A47C 27/00
[52] U.S. Cl. .................. 66/196; 5/653; 297/218; 66/194; 66/195
[58] Field of Search .................. 66/193, 194, 195, 66/196, 198; 5/653, 737; 297/218

[56] References Cited

U.S. PATENT DOCUMENTS

| | | | |
|---|---|---|---|
| 3,926,701 | 12/1975 | Nishiwaki | 66/198 X |
| 4,617,214 | 10/1986 | Billarant | 428/40 |
| 4,842,916 | 6/1989 | Ogawa et al. | 428/100 |
| 5,028,472 | 7/1991 | Gray | 428/100 |
| 5,236,243 | 8/1993 | Reyes | 297/218 |
| 5,308,141 | 5/1994 | Robinson et al. | 297/218 |
| 5,326,150 | 7/1994 | Robinson et al. | 297/218 |
| 5,520,021 | 5/1996 | Clerici | 66/195 X |
| 5,520,022 | 5/1996 | Callaway | 66/195 X |

FOREIGN PATENT DOCUMENTS

| | | |
|---|---|---|
| 0 138 724 A2 | 4/1985 | European Pat. Off. . |
| 0 233 364 A2 | 8/1987 | European Pat. Off. . |
| 2 253 219 | 2/1992 | United Kingdom . |
| 2 253 418 | 9/1992 | United Kingdom . |

Primary Examiner—John J. Calvert
Attorney, Agent, or Firm—George A. Grove

[57] ABSTRACT

A fabric upholstered structure having a core whose external surface is covered by a knitted fabric cover, the external surface of the cover having at least one strip of hook member of any hook/loop fastener attached hereto, the hook member engaging knitted loops on the internal surface of the cover which are formed integrally with the knitted cover.

10 Claims, 4 Drawing Sheets

KNITTED COVERS

This invention relates to knitted covers, particularly but not exclusively to three-dimension knitted covers for seats, especially automobile seats.

BACKGROUND OF THE INVENTION

A problem with car seat covers is that after fitting to the seat cushions and backs, the cover can become displaced on use relative to the respective cushion or back. This is particularly true of seat cushion covers which are subject to constant translational loads as the seat user sits, gets up and shuffles around in the respective seat.

One prior art method of overcoming this problem is to laminate looped Velcro® strip onto an internal surface of the cover for attachment to hooked Velcro® strip molded or adhered to the cushion core, preferably in a recessed area. In the case of knitted seat covers, the Velcro looped strip can be sewn, for example, to the external surfaces of a flap or tubular portion of fabric integrally knitted on an inner surface of the cover. A method of integrally knitting tubular portions of fabric is shown in U.S. Pat. Nos. 5,308,141 and 5,326,150. Yet another method for securing seat covers, particularly knitted covers, is shown in British Patent Application GB-A-2,253,219 which describes a seat cover in which a tube is formed within the body of a double jersey fabric cover, and a rod is inserted through the tube to enable the cover to be pulled down into the structural core of the seat cushion.

SUMMARY OF THE INVENTION

The present invention provides a new method of attachment of knitted covers to a support which is enveloped by the cover.

According to the invention, there is provided a fabric upholstered structure comprising a core with an external surface covered by a knitted fabric cover, the external surface of the core having at least one strip of the hook member of any hook/loop fastener attached thereto, hooks of the hook member engaging with knitted loops formed integrally with the fabric cover.

If the knitted cover includes a chenille yarn of the type disclosed in EP-A-627,516, then the cover may be particularly difficult to adhere to a hook member. In that case where the cover is a double jersey type construction comprising a front layer and a rear layer, then preferably the cover has a single jersey tubular portion extending in a course-wise direction integrally knitted with said rear layer. The hooks engage knitted stitches of at least a portion of the single jersey tubular portion. This enables the cover to be secured to the core by means extending in a course-wise direction.

Preferably, the single jersey tube is split longitudinally, exposing the technical rear face of the single jersey fabric for engagement with the hook member. The single jersey tube may be cut longitudinally, or several courses of the single jersey portion may be formed from a frangible or dissolvable yarn.

Alternatively, at least some of the courses of the single jersey tubular portion may include stitches of a high bulk/textured yarn.

In yet another alternative, the tubular portion includes at least some courses of single jersey structure in which at least some of the knitted loops are coarser than the knitted loops of the double jersey structure. The coarser loops may comprise slip stitches formed during knitting or may be mis-knitted half gauge or quarter gauge stitches.

In a second embodiment of the invention, the rear layer includes wale-wise extending portions of a ladder backed jacquard structure, and preferably the front layer is formed from a chenille yarn. This enables the cover to be secured to the core by means extending in a wale-wise direction.

Also according to the invention, there is provided a method of securing a knitted fabric cover to a core in which a strip of the hook member of a hook/loop fastener is attached to the outer surface of the core, and knitted loops on the inner surface of the fabric engage with hooks of the hooked member.

When the fabric cover has a double jersey construction, preferably a single jersey portion is knitted in a course-wise direction integrally with the rear layer of the double jersey cover, and hooks engage with stitches formed in the single jersey portion.

The single jersey portion may be a tubular portion which is split, allowing the portions of the tubular portion to roll back, exposing cross-stitches for engagement with the hooks.

Preferably, the single jersey portion is knitted at least in part from a high bulk/texturized yarn.

Alternatively, the single jersey portion includes at least a plurality of courses having aligned portions in which a plurality of stitches at desired intervals are formed as slip stitches or are cast-off during the knitting process.

In order to provide a wale-wise extending area of loops for engagement with the hooks, the rear layer of the double jersey fabric cover is knitted as a ladder-back jacquard, for a course-wise width of up to 15 wales.

Preferably, the method of knitting is such that, in the relaxed state, the fabric has from 4 to 6 wales per cm. In practice, this means that preferably the knitting is performed on a machine having a gauge in the range of from 10 to 14 (i.e., a machine having from 3.94 to 5.51 needles per cm), and a 12 gauge machine is preferred for knitting fabric by the method according to the invention.

Particularly suitable yarns for use in carrying out the method according to the invention are air-textured, continuous filament yarns, preferably polyester yarns, having a count, in the unrelaxed state, of from 600 to 1000 decitex, preferably 680 to 780 decitex. The different yarns used in the method according to the invention may be of different materials and/or different counts. On the other hand, the two yarns may be of the same material and the same count but of different colors in order to produce a color pattern in the fabric. Using such polyester yarns to knit a fabric by the method according to the invention on a 12 gauge machine, it is preferred to adjust the settings of said stitch cam means so that, in the relaxed state of the finished fabric, the fabric has at least eight courses or rows per cm. Up to 16 courses may be provided per cm; preferably, there are 9 to 15 or 9.5 to 12 or 10 to 11 courses per cm. There may be 4.5 to 6.5 wales per cm, preferably 4.7 to 6.3 or 5 to 6 or 5.5 to 5.7 or 5.6 wales/cm.

In the case of chenille yarns, suitable yarn has a decitex in the region of 1500 to 2500, preferably 1750 to 2250.

The upholstered fabric cover preferably has a weight in the relaxed state ready for use in excess of 500 g/m$^2$, preferably 500 to 900 g/m$^2$. This compares to traditional knitted products which has a weight of 300 to 350 g/m$^2$.

BRIEF DESCRIPTION OF THE DRAWINGS

The invention will be described by way of example and with reference to the accompanying drawings in which:

FIG. 7b is a knitting diagram for a modified attachment region similar to that in FIG. 7a.

DESCRIPTION OF THE PREFERRED EMBODIMENTS

In order that the invention can be fully understood, reference will be made to a flat V-bed knitting machine. More details on such knitting machines are to be found in the publication "Dubied Knitting Manual" published by Edouard Dubied et Cie SA, near Chatel, Switzerland in 1967. Flat V-bed knitting machines are very well known and many such machines are now computer controlled. It has been proposed recently to manufacture upholstery fabric on such flat V-bed knitting machines and proposals have been made (see for example U.S. Pat. No. 5,308,141) to knit upholstery fabric suitable for use in vehicles.

The knitting of a fabric cover by the method according to the invention uses a Dubied Jet 2F machine with 12 gauge needles. This machine is a flat V-bed machine of the type provided with presser foot means to assist take-down of the knitted fabric. The machine can operate with a plurality of yarn supplies, each of which is associated with a cam box.

The cam box traverses across the needle beds supplying yarn to the needles as desired in each direction of travel.

Figure 1:
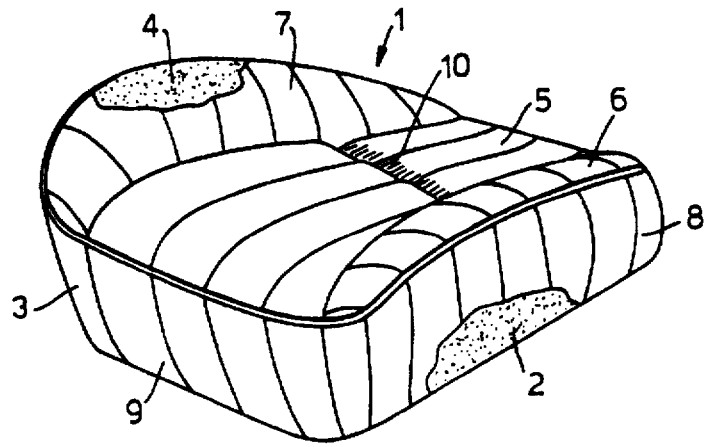
FIG. 1 is an isometric view of a seat cushion.

Referring to FIG. 1, there is shown an upholstered seat cushion or squab generally indicated by 1. The seat cushion is formed by the covering of a core 2 normally in the form of semi-rigid foam with a fabric cover generally indicated by 3. The core is shaped so as to provide wings 4 or any other desired shape in the seat.

Such seats have particular application in vehicles but may be used in numerous other applications.

Stretched over the core 2 is a fabric cover 5, which is provided with a main body portion covering the seat with integral wing portions 6, 7 and side portions such as portion 8. There is also a front portion 9, and the fabric cover is folded over the base of the seat squab and may be secured in a manner known per se. The seat may have indentations 10 formed therein in order to create aesthetic effects.

Figure 4:
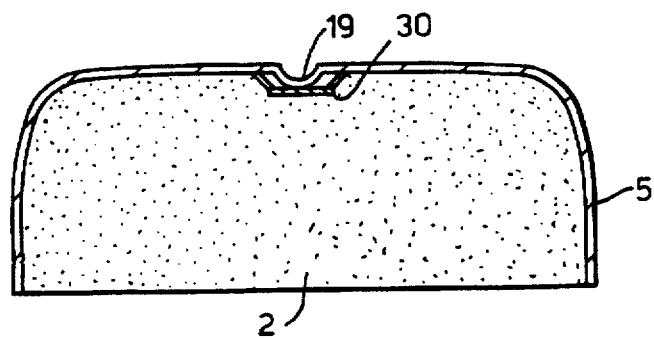
FIG. 4 is section through the cushion of FIG. 1 showing the use of Velcro hook member strip to secure the cover to the core through an attachment region on the back of the cover.

Such seat structures are described in U.S. Pat. No. 5,308,141 referred to above. In that application, there is described a knitted fabric upholstery cover which is knitted in a single operation. The present invention is illustrated in FIG. 4 in which the fabric cover 5 is stretched over the core 2. In order to help form the groove 10, and additionally or alternatively to prevent the fabric cover 5 from displacement on the core 2, the underside of the cover is attached to at least one strip of the hook member(s) 30 of a hook and loop fastener(s). Hook and loop fasteners are described in British Patent 721,338 and are sold under the trade name Velcro.

The hooks of the hook member will adhere directly to the yarn loops of the knitted fabric. However, in some applications it will be difficult if not impossible for the hook member to adhere to a knitted surface, for example when the knitted car seat cover is made from a chenille yarn as described in document EP-A-0,627,516. In these instances, it will be necessary to create attachment areas on the inner surface of the cover 5 adjacent the hook fastener on the core.

Figure 2:
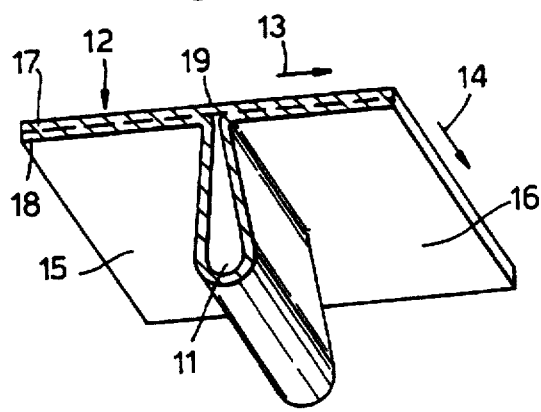
FIG. 2 is a portion of the knitted double jersey seat cover showing the formation of a single jersey tubular portion in a course-wise direction.
Figure 3:
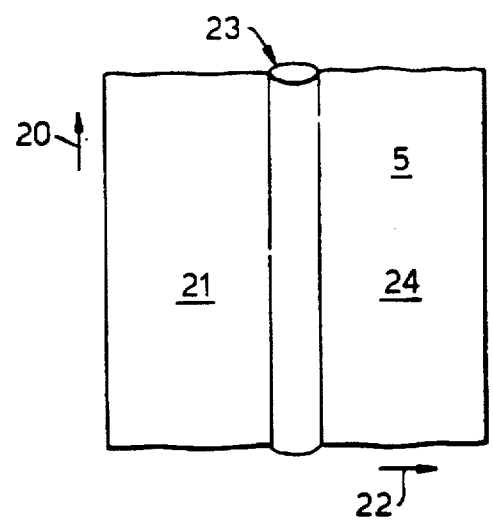
FIG. 3 is a portion of the knitted double jersey seat cover showing a ladder-back zone extending in a wale-wise direction.

Dependent upon the direction of the indentation, or a desired line of attachment of the cover 5 to the core 2, the inner surface of the cover can be formed with either a course-wise extending attachment area (see FIG. 2) or a wale-wise extending attachment area (see FIG. 3).

As shown in FIG. 3, the fabric cover 5 has a wale-wise direction 20 and a course-wise direction 22. The fabric cover 5 is weft knitted on a V-bed knitting machine and in a wale-wise direction 20 a ladder-back jacquard region 23 is formed to create loops of yarn to which the hook member 30 (see FIG. 4) can adhere.

Figure 5:
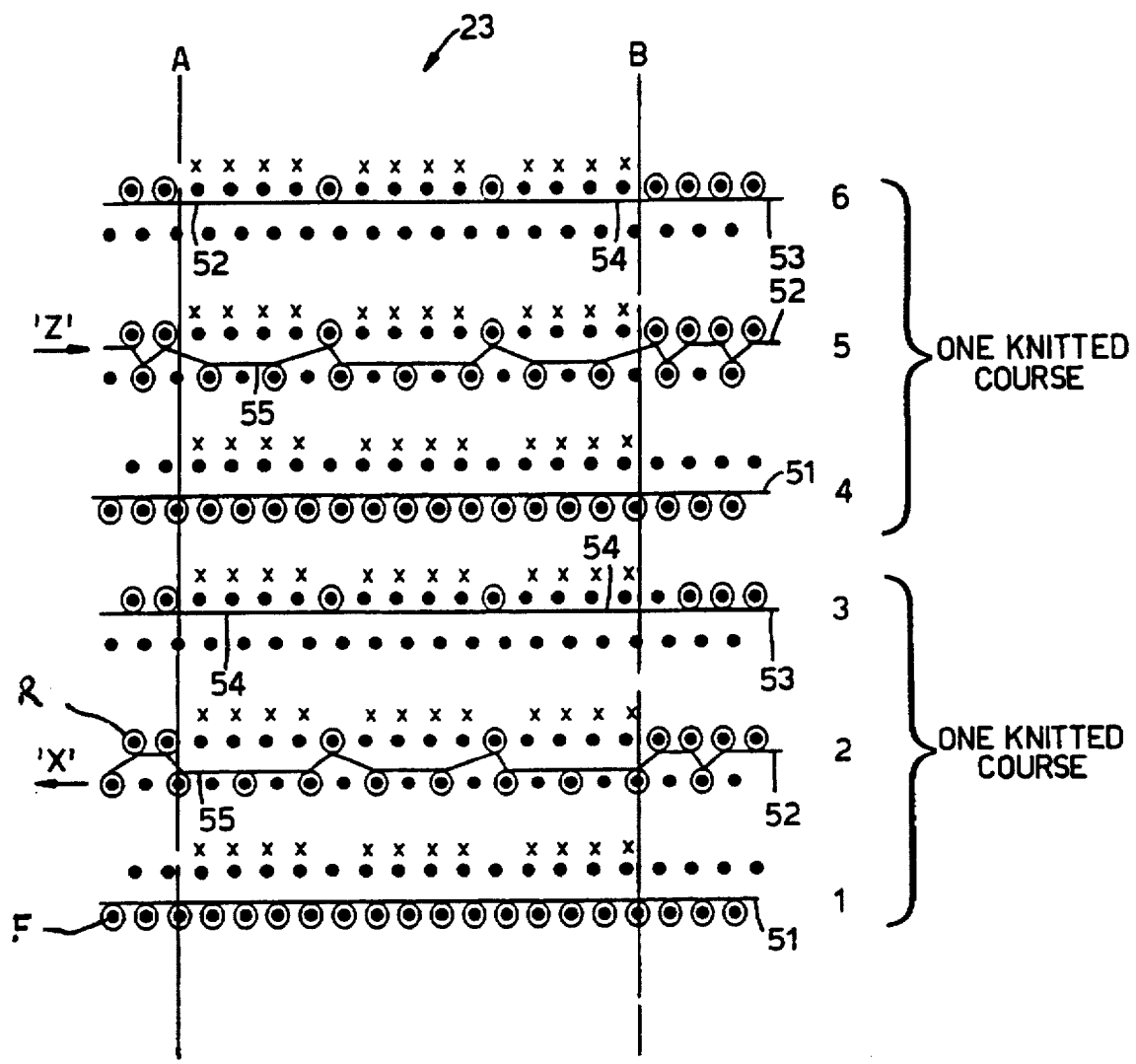
FIG. 5 is a knit diagram illustrating the formation of a ladder-backed jacquard attachment region extending in a wale-wise direction.

The fabric cover illustrated in FIG. 3 is knitted in accordance with the stitch diagram shown in FIG. 5. FIG. 5 comprises a stitch diagram for six rows of stitching for a two knitted course repeat jacquard structure having a ladder-back region 23 between the lines A and B.

In the stitch diagram FIG. 5, each row labeled 1–6 represents an individual row of knitting, with the rows 1, 2 and 3 each using a different yarn on one pass of a cambox, and the rows 4, 5 and 6 using said different yarns on the return pass of the cambox. In each row, such as row 1, the upper line of small dots represents individual needles on the rear bed of the knitting machine. Similarly, the lower row of small dots represents the front bed of the knitting machine. In the nomenclature used herein, the front layer (F) of the fabric is knitted on the front needles represented by the lower row of dots. The rear layer (R) is knitted on the rear needle bed represented by the upper row of dots. The yarn which is knitted is represented by the loops and interconnecting cross-links. The symbol X represents a needle which has been pressed off.

The area outside of the lines A and B represents a double jersey structure fabric preferably knitted from a chenille yarn according to European Patent Application EP-A-0,627,516. The region 23 between the lines A and B represents the wale-wise extending attachment zone. In the first pass of the cambox on the knitting machine, from right to left in the direction of arrow X, the field or background yarn, a chenille yarn 51, is knitted on the needles on the front bed. There is no difference in the region between the lines A & B. The first contrast yarn 52 is knitted on alternative needles on the front bed and all needles on the back bed (row 2), there being interconnecting loops between the yarn knitted on the front bed and the rear bed. The second contrast yarn 53 is then knitted on all the needles on the rear bed (row 3). The needles in the rear bed marked with an X symbol were pressed off at the commencement of the knitting operation and take no part in the process. The second contrast yarn 53 will provide long float stitches 54 on the rear face knitted fabric between the lines A & B.

The rows 4–6 represent the next pass of the cambox from left to right in the direction of arrow Z. The procedure for the chenille yarn 51 on the front needle bed and the second contrast yarn 53 is as before. The first contrast yarn 52 is now knitted on alternate needles on the front bed, which needles are the alternative needles to those on the previous pass of the cambox.

The long float loops 54 provide the main attachment points for the hook member, although the first contrast yarn will provide shorter float stitches 55 on the reverse side of the front face of the cover.

While the above description relates to a two color jacquard, the procedure is applicable to other jacquard structures and color combinations. The region between the lines A–B is known as a ladder-back jacquard and provides an attachment area.

Attachment areas that extend in a substantially coursewise direction are formed using a method based on integrally knitting a tubular portion 11 (see FIG. 2) as described in U.S. Pat. No. 5,308,141 and British Patent Application GB-A-2,253,219.

The upholstery fabric generally indicated by 12 is formed of a double jersey type structure. A double jersey knitted structure is produced on a flat V-bed knitting machine and may be regarded as a pair of single jersey knitted fabric layers each formed of a plurality of integrally connected loops or stitches in which the two fabric layers, a front layer 17 and a rear layer 18, are interconnected by loops or stitches to form a double layered structure as can be seen in FIG. 5. The tubular portions may be regarded as being formed by having regions where the interconnection between the face and rear layers has been omitted.

In the arrangement illustrated in FIG. 2, the fabric has a wale-wise direction 13 and a course-wise direction 14. The knitted tubular portion 11 is produced by holding up the knitting on the face of the fabric while continuing to knit on the rear needle bed of the fabric to produce a larger rear fabric layer which is not interconnected to the face and hence forms the tubular portion 11. Thus, the portions 15 and 16 of the fabric have integrally formed double jersey layers 17 and 18 which are knitted together with inter-engaging loops. The tubular portion 11 is produced by excessively knitting on the rear fabric layer while holding up the knitting on the front layer. It can be seen, therefore, that in the region of the tubular portion 11, the front knitted layer is very short whereas the rear knitted layer has a single jersey structure and is very long and the tube can be as deep as desired. Continuing the knitting produces the portion 16 of the double jersey structure. It will be appreciated that the structure illustrated in FIG. 2 is therefore a weft knitted structure knitted in the direction of arrow 13 with the wale-wise direction in that direction and the course-wise direction being in the direction of arrow 14 and lying substantially parallel to the longitudinal axis of the tubular member 11.

Figure 6A:
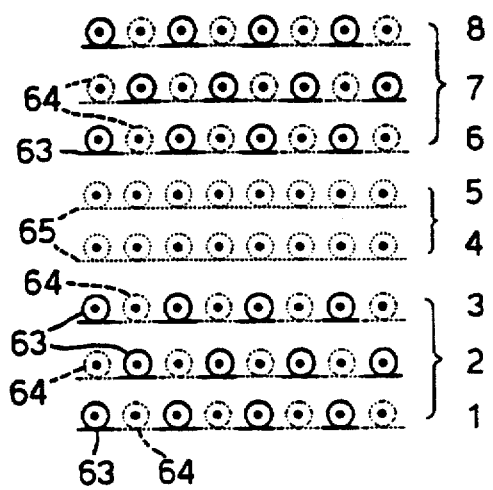
FIGS. 6 and 6a are a schematic drawing and a knit diagram for a first method of providing an attachment region extending in a course-wise direction.
Figure 6:
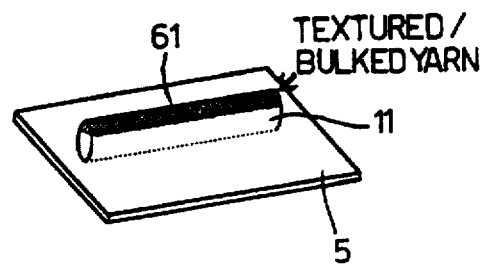

Referring to FIGS. 6 and 6a, in FIG. 6 there is illustrated one method of forming a course-wise extending attachment zone in which the tubular portion 11 of the cover 5 is formed as described above and has an elongate single jersey area 61 formed from textured/bulked yarn which will present a fleecy surface for attachment to a strip of Velcro hook member 30.

The stitch diagram 6a is a conventional type and represents individual rows of the rear bed of the knitting only, the front bed of the knitting machine being held up as described above.

The selected yarns 63, 64 are knitted on the back bed only in a plurality of rows or courses which for the sake of example only are shown as courses 1 to 3. Thereafter, a high bulk/textured yarn 65 is knitted on all the needles on the back bed (rows 4 and 5) in place of the original yarns. Although only two rows of high bulk/textured yarn are shown in FIG. 6, it will be apparent that any number of rows can be knitted as desired. After the high bulked yarn has been knitted, the original yarns 63, 64 are reintroduced to rows 6–8 to complete the tubular portions 11.

It will be appreciated that the high bulk textured yarn could be used as one of the two selected yarns, or the whole tubular portion (rows 1–7) could be knitted in the textured yarn. When the fabric is heat relaxed, the high bulked/textured yarn will give a fleecy surface for adherence of the Velcro hook member.

Figure 7A:
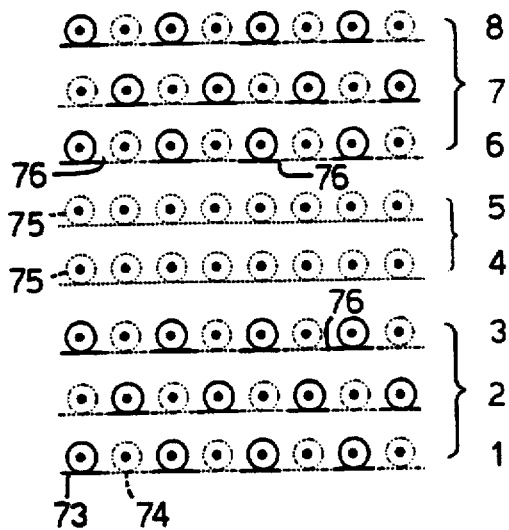
FIGS. 7 and 7a are a schematic drawing and a knit diagram for a second method of providing a course-wise extending attachment region.
Figure 7:
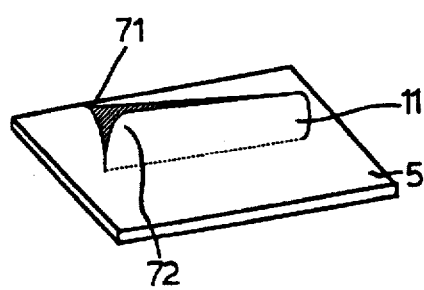

A second method of forming an attachment area is illustrated with reference to FIG. 7 and 7a in which a tubular portion 11 is made as previously described and then split longitudinal, allowing two flaps 71, 72 formed therefrom to curl apart, exposing the inner stitches for attachment to the Velcro hooks.

Again, the knitting diagram 7a represents only the rear needle bed, the front bed being inactive. Two selected yarns 73, 74 are knitted on alternate needles for a plurality of rows, represented by rows 1–3. A dissolvable or a friable yarn 75 is then knitted on all the selected needles for at least one and preferably two courses (row 4–5). After the dissolvable yarn or friable yarn has been knitted, the original selected yarns 73, 74 are reintroduced to complete the tubular portion (row 6–8). When the knitted fabric is heat relaxed, the dissolvable yarn disintegrates allowing the two flaps 71, 72 to roll back on themselves, revealing the cross floats 76 to which the Velcro hooks can adhere.

A friable yarn can be similarly removed by any suitable method.

Figure 7B:
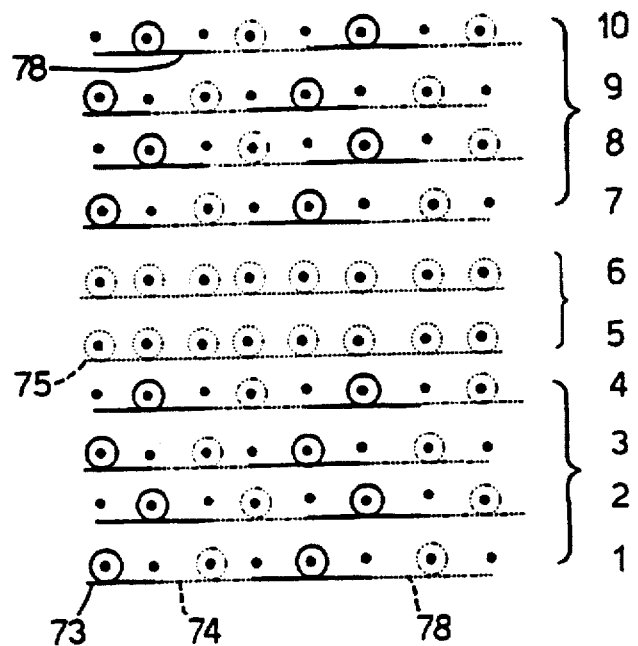

A variation on the second method is shown in FIG. 7b in which selected yarns 73, 74 are knitted on every fourth needle alternatively, to produce very loose-knit flaps 71, 72 with very long floats 78. With this method, it is necessary to knit two courses to form one knitted row so that to form the same size flap it is necessary to knit more courses than above (i.e., FIG. 7a).

The dissolvable yarn 75 is used as above.

Figure 8A:
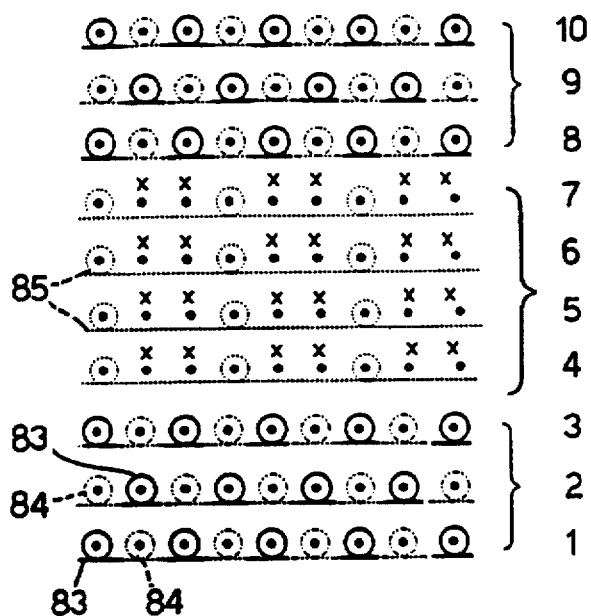
FIGS. 8 and 8a are a schematic drawing and a knit region for a third method of providing a course-wise extending attachment region.
Figure 8:
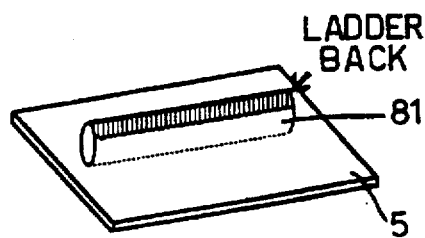

A third method of forming an attachment area is illustrated with reference to FIGS. 8 and 8a in which the tubular portion is again made by excessive knitting of a single jersey tubular portion 81 on the rear needle bed while the front needle bed is inactive. In this case, a plurality of courses are knitted from two selected yarns 83, 84 which are knitted on alternate needles as shown for rows 1–3. The loose-knit zone is then formed by pressing-off selected needles shown by an X symbol and continuing to knit on every third needle, as shown, using only either one of the selected yarns or a different yarn 85 to create a loose knit or a ladder-back effect in rows 4–7. After the loose knit courses have been knitted, the original yarns 83, 84 are reintroduced to complete the flap.

While the ladder-back region as shown is formed by knitting on every third needle, it is possible to knit on every fourth needle or every fifth needle depending upon the gauge of machine used and the decitex of the yarn. Although in the preferred embodiments the yarn 85 is knitted to form slip stitches which are pressed off the needles, it is possible to merely inactivate the respective needles, but this will then create a tighter ladder back effect.

What is claimed is:

1. A fabric upholstered structure comprising a core with an external surface covered by a knitted fabric cover of a generally double jersey construction having a front layer and a back layer that are interconnected by knitted stitches, said cover comprising an attachment region in which the back layer is not connected to the front layer and in which region the back layer has a different stitch structure than in the double jersey construction, the external surface of the core having at least one strip of hook fasteners attached thereto, hooks of the hook fasteners engaging with knitted loops on the back layer in said attachment region of the fabric cover.

2. A structure as claimed in claim 1 wherein the cover is a double jersey type construction comprising a front layer and a rear layer, and said attachment region comprises a single jersey tube portion extending in a course-wise direction integrally knitted with said rear layer, the hooks of said hook fasteners engaging knitted stitches of at least a portion of the single jersey tube.

3. A structure as claimed in claim 2 wherein the single jersey portion is a tubular portion having an inner face and an outer face, which tubular portion was split longitudinally of the tube, exposing the inner face of the single jersey material for engagement with the hook fastener member.

4. A structure as claimed in claim 2 wherein the single jersey portion is a tubular portion knitted from at least one yarn which is a high bulk/textured yarn.

5. A structure as claimed in claim 4 wherein the tubular portion is knitted from a plurality of yarns, and a plurality of courses of said tubular portion consist of high bulk/textured yarn only.

6. A structure as claimed in claim 2 wherein the single jersey portion is a tubular portion that extends in a course-wise direction and the tubular portion comprises a plurality of courses of single jersey structure in which at least some of the knitted loops are coarser than the knitted loops of the double jersey structure.

7. A structure as claimed in claim 6 wherein the coarser loops consist of slip stitches formed during the knitting process.

8. A structure as claimed in claim 6 wherein the knitted loops are mis-knitted half gauge or quarter gauge knitted stitches.

9. A structure as claimed in claim 1 wherein the cover is a double jersey construction having a front layer and a rear layer, and the rear layer in said attachment region includes wale-wise extending portions of ladder back jacquard, the hooks of said hook fasteners engaging in knitted stitches of the ladder back jacquard portions.

10. A structure as claimed in claim 9 wherein the ladder-back jacquard region extends across about 15 wales with a knitted loop being formed every fifth wale for a 12 gauge knitted fabric and a knitted loop being formed every other wale for a 5 gauge knitted fabric.

* * * * *